(12) United States Patent
Constans

(10) Patent No.: US 7,952,492 B2
(45) Date of Patent: May 31, 2011

(54) LANDING ASSISTANCE DEVICE AND METHOD FOR AIRCRAFT

(75) Inventor: Florian Constans, Riedisheim (FR)

(73) Assignee: Airbus France, Toulouse (FR)

( * ) Notice: Subject to any disclaimer, the term of this patent is extended or adjusted under 35 U.S.C. 154(b) by 288 days.

(21) Appl. No.: 12/304,451

(22) PCT Filed: Jun. 7, 2007

(86) PCT No.: PCT/FR2007/000939
§ 371 (c)(1),
(2), (4) Date: Dec. 11, 2008

(87) PCT Pub. No.: WO2007/144484
PCT Pub. Date: Dec. 21, 2007

(65) Prior Publication Data
US 2009/0195413 A1 Aug. 6, 2009

(30) Foreign Application Priority Data
Jun. 12, 2006 (FR) ...................................... 06 05157

(51) Int. Cl.
*G01C 23/00* (2006.01)
*G05D 1/12* (2006.01)

(52) U.S. Cl. ........................ 340/973; 340/974; 244/187

(58) Field of Classification Search ................... 340/947, 340/951, 971, 973, 974, 975, 976, 978, 979; 244/183, 187, 188
See application file for complete search history.

(56) References Cited

U.S. PATENT DOCUMENTS

| | | | | |
|---|---|---|---|---|
| 4,106,731 A * | 8/1978 | Bliss | ............................. | 244/188 |
| 4,133,503 A * | 1/1979 | Bliss | ............................. | 244/188 |
| 5,020,747 A * | 6/1991 | Orgun et al. | .................. | 244/187 |
| 5,206,654 A * | 4/1993 | Finkelstein et al. | ......... | 342/410 |
| 5,823,479 A * | 10/1998 | Nield et al. | .................. | 244/187 |
| 7,611,098 B2 * | 11/2009 | Van Boven | .................. | 244/183 |
| 2004/0044446 A1 | 3/2004 | Staggs | | |
| 2004/0075586 A1 | 4/2004 | Glover | | |
| 2004/0167685 A1 | 8/2004 | Ryan | | |

FOREIGN PATENT DOCUMENTS
FR 06 01395 8/2007

OTHER PUBLICATIONS

International Search Report dated Jun. 9, 2007 w/ English translation.
Written Opinion of the International Searching Authority with English translation, (Dec. 16, 2008).

* cited by examiner

*Primary Examiner* — Van T. Trieu
(74) *Attorney, Agent, or Firm* — Dickinson Wright PLLC

(57) ABSTRACT

A landing assistance device and method for an aircraft according to the invention, based on the landing procedure rules attached to the runway, a lower threshold and an upper threshold of total energy acceptable for the aircraft are determined and the current total energy of the latter is compared with the thresholds.

10 Claims, 2 Drawing Sheets

LANDING ASSISTANCE DEVICE AND METHOD FOR AIRCRAFT

CROSS-REFERENCE TO RELATED APPLICATIONS

This application is a national stage filing under Section 371 of International Application No. PCT/FR2007/000939, filed on 7 Jun. 2007 and published in French on 21 Dec. 2007, which is a continuation of and claims priority to French Application No. FR 06 05157, filed on 12 Jun. 2005, the entire subject matter of these applications are incorporated herein by reference.

The present invention relates to a landing assistance method and device for an aircraft.

BACKGROUND OF THE INVENTION

It is known that, in the approach phase leading to the landing of an aircraft on a runway, piloting of the latter is particularly difficult. In this approach phase, the pilot has a large quantity of information, some of which must enable him to avoid a tail or wingstrike with the ground, a hard landing or even a departure from the runway. This information principally comprises the speed of the aircraft, the slope of the aircraft and the height of the aircraft above the ground, these three items of information being displayed in the cockpit, so that the pilot can easily monitor them. Furthermore, the view of the environment gives the pilot a perception of his approach plane.

The total energy level of the aircraft, a combination of its speed and its height, is an essential parameter for estimating the risk of runway departure. However, it cannot always be estimated by the pilot. Furthermore, the energy level can be affected by the wind.

SUMMARY OF THE INVENTION

The object of the present invention is therefore to inform the pilot as to the energy state of his aircraft at all times in the approach phase.

To this end, according to the invention, the landing assistance method for an aircraft in approach phase located at a current height h and descending toward a runway following, with a current approach speed V, a current approach trajectory forming with said runway a current approach angle $\gamma$, said current approach speed V and said current approach angle $\gamma$ ideally needing to be close, respectively, to a constant reference approach speed Vr and a constant reference approach angle $\gamma r$ associated with said runway,
is noteworthy in that:
  a range of approach speed values is predetermined, either side of said reference approach speed Vr, that will allow for a complete stoppage of said aircraft on said runway in the case where the current approach angle $\gamma$ is at least approximately equal to said reference approach angle $\gamma r$, said range of approach speed values being delimited by a lower limit value Vinf and by an upper limit value Vsup;
  a range of approach angle values is predetermined, either side of said reference approach angle $\gamma r$, that will allow for a complete stoppage of said aircraft on said runway in the case where the current approach speed V is at least approximately equal to the reference approach speed Vr, said range of approach angle values being delimited by a lower limit value $\gamma inf$ and by an upper limit value $\gamma sup$;
  there are calculated:
    a lower total energy threshold Einf, corresponding to the situation for which the current approach speed V and the current approach angle $\gamma$ are respectively equal to said lower limit value Vinf and said lower limit value $\gamma inf$,
    an upper total energy threshold Esup, corresponding to the situation for which the current approach speed V and the current approach angle $\gamma$ are respectively equal to said upper limit value Vsup and said upper limit value $\gamma sup$, and
    the current total energy E of said aircraft; and
  said current total energy E is compared with said lower Einf and upper Esup total energy thresholds to obtain an indication as to the theoretical possibility for said aircraft to stop on said runway.

The present invention exploits the fact that each runway has an associated set of procedure rules, including those which concern the landing recommend (or impose) a reference approach speed and a reference approach angle. Furthermore, the present invention notes that, in civilian air transport, the piloting of the aircraft observes these landing procedure rules as far as is possible.

Thus, according to the invention, said lower total energy threshold, which considers the lowest possible approach speed and approach gradient, represents a floor energy level for the aircraft to be able to successively make a correct landing. However, to the latter end, said upper total energy threshold, which takes into account the highest possible approach speed and gradient, constitutes a ceiling energy level. The current total energy of the aircraft will therefore need to be located between these floor and ceiling total energy levels. Below the floor total energy level, the aircraft exhibits a total energy deficit that the pilot must seek to overcome by acting on the engines and/or the elevation control surfaces. On the other hand, above this ceiling total energy level, the total energy of the aircraft is in surplus and the pilot must seek to dissipate it using the engines, the elevation control surfaces, the air brakes, and so on.

Obviously, comparing the current total energy E with said lower Einf and upper Esup thresholds and only makes it possible to determine whether the aircraft can stop or not: the effective stopping of the aircraft on the runway (with or without runway departure) depends on other standard parameters, such as the state of the runway (rain, ice, etc.), the state of the tires of the landing gear, and so on.

The comparison between the current total energy E of the aircraft, on the one hand, and said lower Einf and upper Esup total energy thresholds and can be performed in many different ways.

For example, the following index I1 can be calculated:

$$I1 = \frac{E - Einf}{Esup - Einf}$$

an index that must be between 0 and 1 to correspond to an acceptable energy level for a correct approach and landing.

As a variant, it is possible:
  to calculate a reference total energy Er corresponding to the situation for which the approach speed and the approach angle are respectively equal to the reference approach speed Vr and the reference approach angle $\gamma r$; and
  to compare said current total energy E and said reference total energy Er, the result of this comparison itself being compared to at least one of said lower Einf and upper Esup thresholds.

In this case:
if E is greater than Er, E−Er can be compared to Esup−Er; and
if E is less than Er, E−Er can be compared to Einf−Er.

Said lower Vinf and upper Vsup approach speed limit values are, preferably, at least approximately equal to said reference approach speed Vr, respectively minus and plus a few kts. For example, the lower limit value Vinf can be equal to Vr−3 kts, whereas the upper limit value Vsup can be equal to Vr+10 kts.

Similarly, said lower γinf and upper γsup approach angle limit values are, advantageously, at least approximately equal to said reference approach angle γr, respectively minus and plus a few tenths of a degree. For example, in the usual case where the reference approach angle γr is close to 3°, the lower and upper limit values can be equal to γr−0.3° and γr+0.3°. Obviously, the angle deviations are chosen in accordance with the authorized ranges for the runway concerned.

The result of this comparison, which is representative of the fact that the total energy level of the aircraft is correct, excessive or deficient, can be brought to the knowledge of the pilot by any known means, such as audible or visual alarms or warnings, display, and so on. Thus, where appropriate, the pilot can attempt, knowing the cause, to correct an incorrect energy level or even to perform a go-around maneuver. To this end, it is important for the result of this comparison to be displayed close to the pilot, notably on a standard piloting screen that is frequently observed by the latter, such as the PFD screen.

It will be noted that the total energy variation of an aircraft is relatively slow, such that it can be advantageous to provide the pilot, in addition, with a more rapid trend of this situation of his aircraft. It is thus possible to provide for said total energy comparison result to have associated with it a prediction indication concerning the complete stoppage of the aircraft on said runway, for example such as that generated by implementing the method described in the French patent application No. 06 01395 filed on 17 Feb. 2006.

To implement the method according to the present invention, it is possible to use a device comprising:
 computation means:
  receiving at least the information concerning the current mass m, the current height h, the current approach speed V and the current approach angle γ of the aircraft, and the lower speed limit value Vinf, the upper speed limit value Vsup, the lower approach angle limit value γinf and the upper approach angle limit value γsup and, where appropriate, the reference approach speed Vr and the reference approach angle γr; and
  calculating at least one index, the value of which is representative of the fact that the level of said current total energy E of the aircraft is correct, excessive or deficient; and
 comparison means comparing said index to at least one threshold value corresponding to a transition between a correct total energy level and an excessive or deficient total energy level, said comparison means being able to actuate at least one warning or alarm device, at least in the case where said current total energy level E of the aircraft is excessive or deficient.

BRIEF DESCRIPTION OF THE FIGURES

The figures of the appended drawing will clearly show how the invention can be implemented. In these figures, identical references denote similar elements.

DETAILED DESCRIPTION OF THE INVENTION

Figure 1:
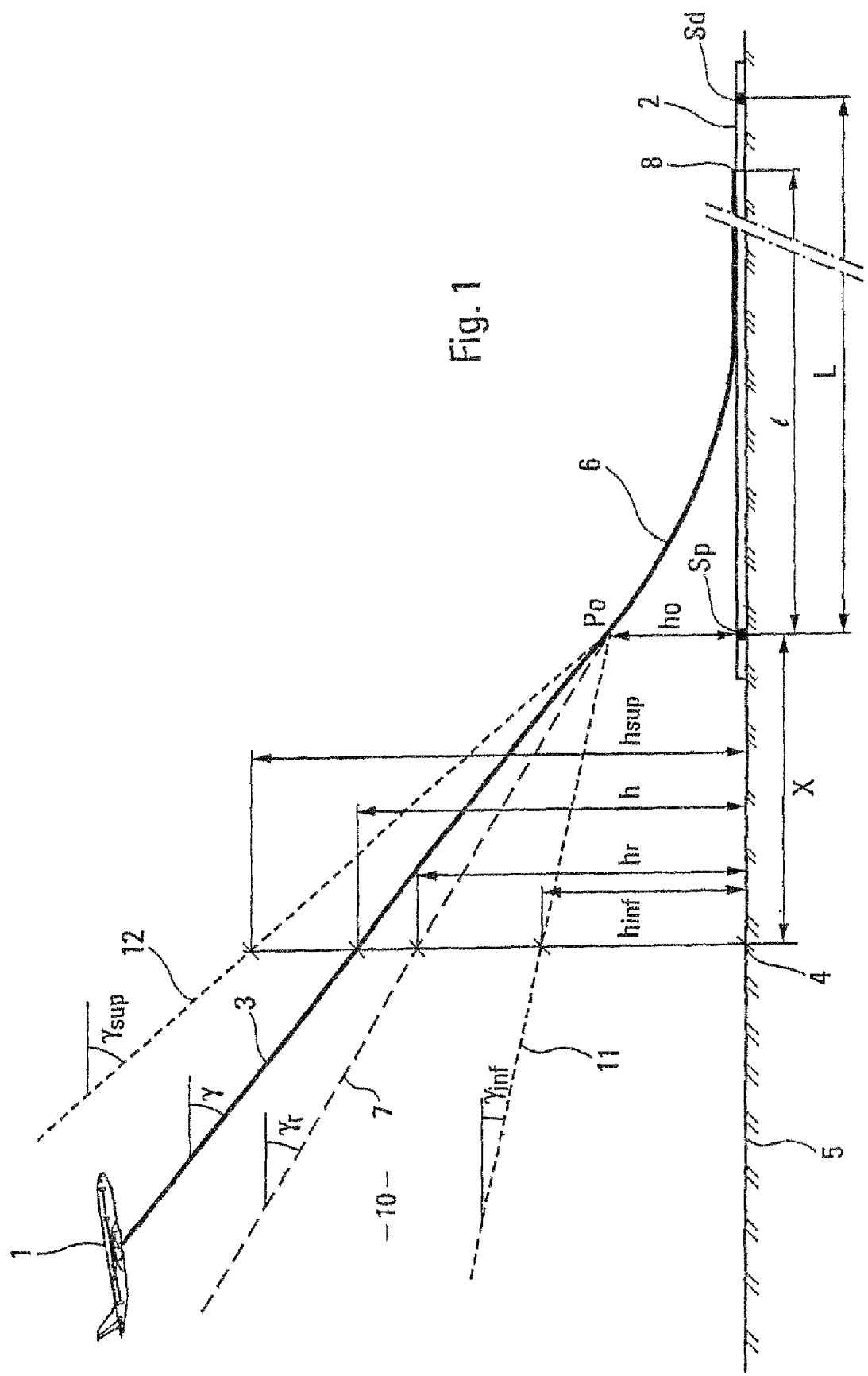
FIG. 1 is a diagram illustrating the method according to the present invention.

In the situation diagrammatically represented in FIG. 1, an airplane 1 is in the approach phase with a view to landing on a runway 2, the useful length L of which is delimited between a near-end threshold Sp and a far-end threshold Sd. The airplane 1 follows a current approach trajectory 3, with a current approach angle γ, descending toward the runway 2 with a current approach speed V. When the airplane 1 is at the horizontal distance X from said near-end threshold Sp, that is, at the vertical to the point 4 on the ground 5 a distance of X away from the near-end threshold Sp, its current height on the current trajectory 3 is equal to h.

According to the landing procedure rules attached to the runway 2, to optimize the chances of a correct landing, the current approach trajectory 3 of the airplane 1 must pass through a reference point Po located at the regulatory height ho above the near-end threshold Sp and corresponding to the start of the leveling-off 6 of the trajectory 3. Furthermore, according to these landing procedure rules, the airplane 1 should ideally be located on a reference approach trajectory 7, obviously passing through the reference point Po and presenting the reference approach angle γr, the speed of said airplane on said reference approach trajectory 7 being equal to a reference approach speed Vr. In such an ideal situation, the aircraft 1 would be certain, unforeseen circumstances apart, of being able to stop at a point 8 of the runway 2, remote from the near-end threshold Sp of the runway 2 by a distance l less than the useful length L of the latter. At the vertical to said point 4, the height of said reference approach trajectory 7 is designated by hr.

According to the present invention, in order to be able to predict whether the aircraft, with its current approach speed V and its current gradient γ has the possibility of stopping completely on the runway 2, the first step is to:
 predetermine (in a way not shown in FIG. 1), either side of the reference approach speed Vr, a range of approach speed values that will allow for a complete stoppage of the airplane 1 on the runway 2 in the case where the current approach angle γ is at least approximately equal to the reference approach angle γr, said range of approach speed values being delimited by a lower limit value Vinf and by an upper limit value Vsup; and
 predetermine, either side of said reference approach angle γr, a range 10 of approach angle values that allow for a complete stoppage of the airplane 1 on the runway 2 in the case where the current approach speed V is at least approximately equal to the reference approach speed Vr, said range 10 being delimited by a lower limit value γinf corresponding to a lower approach limit trajectory 11 and by an upper limit value γsup corresponding to an upper approach limit trajectory 12. At the vertical to said point 4, the heights of said lower and upper approach limit trajectories 11 and 12 are respectively designated by hinf and hsup.

After predetermining these two ranges of approach speed and approach angle values, the following are calculated:

$$E = \frac{1}{2}mV^2 + mgh, \qquad (1)$$

h being known on board the airplane 1 and m being the mass of the latter and g the acceleration of gravity;

a lower total energy threshold Einf, corresponding to the situation for which the approach speed and angle of the airplane 1 would be respectively equal to the lower limit value Vinf and to the lower limit value γinf, said lower threshold therefore being equal to $$Einf = \frac{1}{2}mVinf^2 + mghinf, \qquad (2)$$

with $$hinf = ho + X\tan\gamma inf$$

tan γinf being the tangent of the lower approach angle limit value γinf and the distance X being equal to h/tan γ, tan γ being the tangent of the current approach angle γ; and an upper total energy threshold Esup, corresponding to the situation for which the approach speed and angle of the airplane 1 would be respectively equal to the upper limit value Vsup and to the upper limit value γsup, said threshold therefore being equal to $$Esup = \frac{1}{2}mVsup^2 + mghsup, \qquad (3)$$

with $$hsup = ho + X\tan\gamma sup$$

tan γsup being the tangent of the upper approach angle limit value γsup.

Then, the current total energy E of the airplane 1 is compared to said lower and upper total energy thresholds Einf and Esup.

To this end, an index I1 can be calculated, given by the expression $$I1 = \frac{E - Einf}{Esup - Einf} \qquad (4)$$

It can be seen that:

if I1 is greater than 1, the current total energy E of the airplane 1 is too high and the risk of longitudinal runway departure is real;

if I1 is less than 0, the current total energy E of the airplane 1 is too low and the airplane risks not being able to touch down beyond the near-end runway threshold Sp; and on the other hand, if I1 is between 0 and 1, the current total energy E of the airplane 1 corresponds to a well-executed approach, enabling the airplane 1 to stop on the runway 2.

In order to compare the current total energy E of said lower and upper total energy thresholds Einf and Esup, it is possible, as a variant, to use a reference total energy Er corresponding to the situation for which the approach speed and the approach angle of the airplane 1 are respectively equal to the reference approach speed Vr and to the reference approach angle γr. This reference total energy is therefore equal to:

$$Er = \frac{1}{2}mVr^2 + mghr, \qquad (5)$$

with $$hr = ho + X\tan\gamma r$$

tan γr being the tangent of the reference approach angle γr.

In the case where E is greater than Er, the following index can be calculated $$I2 = \frac{E - Er}{Esup - Er} \qquad (6)$$

which must remain less than 1 to correspond to a correct approach. If I2 is greater than 1, the airplane 1 exhibits excessive energy, preventing it from stopping on the runway 2.

In the case where E is less than Er, the following index can be calculated $$I3 = \frac{E - Er}{Einf - Er} \qquad (7)$$

which must be greater than 1 to correspond to a correct approach of the airplane 1 to the runway 2. If I3 is less than 1, the total energy of the airplane 1 is insufficient for a correct approach to the runway 2.

Figure 2:
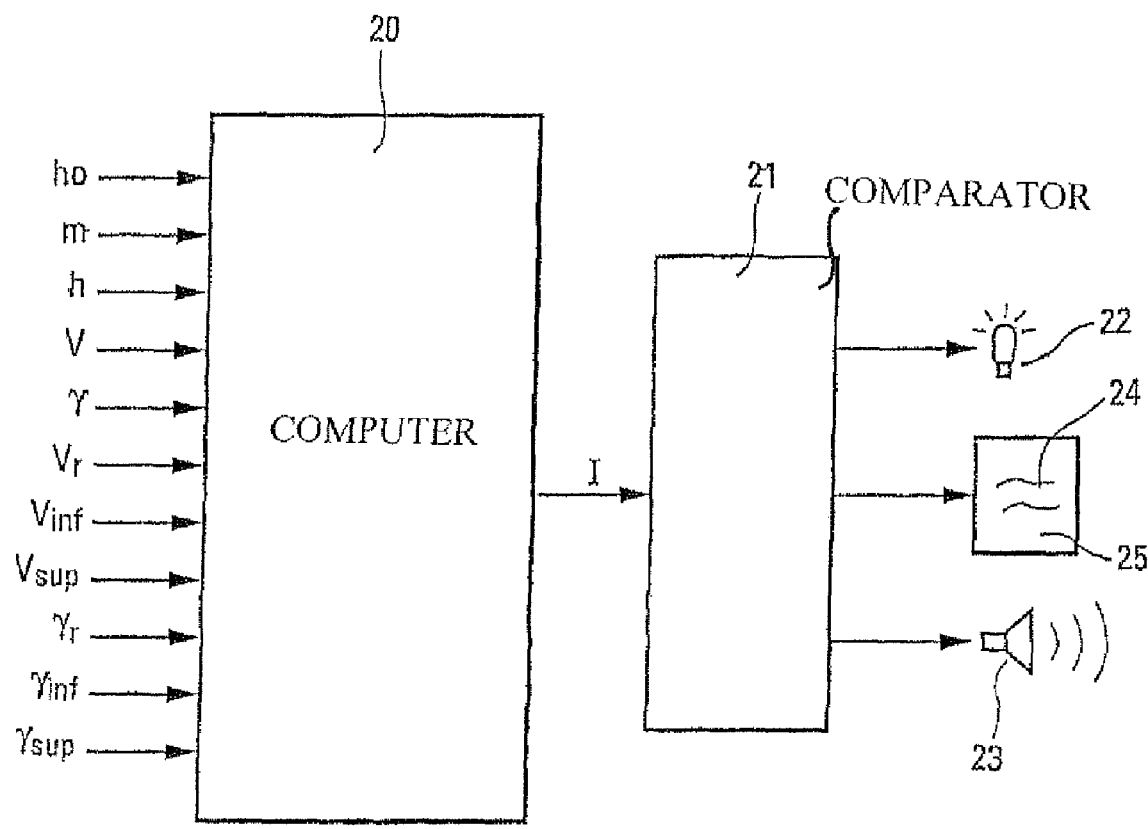
FIG. 2 is the block diagram of a device for implementing the inventive method.

To perform the abovementioned computations and comparisons, the device illustrated in FIG. 2 can be used. This device comprises a computer 20 receiving at its inputs the regulatory height ho of the reference point Po, the mass m, the height h, the current approach speed V, the current approach angle γ, the lower speed limit value Vinf, the upper speed limit value Vsup, the lower approach angle limit value γinf and the upper approach angle limit value γsup. The computer 20 can also receive at its inputs the reference approach speed Vr and the reference approach angle γr.

Using the expressions (1), (2), (3), and (4), the computer 20 respectively calculates the current total energy E, the lower total energy threshold Einf and the upper total energy threshold Esup. It can also calculate the index I1. Using the expressions (5), (6) and (7), the computer 20 can, as a variant, calculate the reference total energy Er and the indices I2 and I3.

The computer 20 transmits an index I, representative of the index I1 or of the indices I2 and I3, to a comparator 21 (which can be an integral part of said computer 20) able to compare the value of said index I to at least one threshold (equal to 0 or 1 as a result of the foregoing) and to activate visual 22 and/or audible 23 alarms or warnings and/or able to display alarm or warning messages 24 on screens 25, in the case where the value of the index I shows an excess or a deficit of energy that does not enable the airplane 1 to perform a correct approach and landing.

Figure 3:
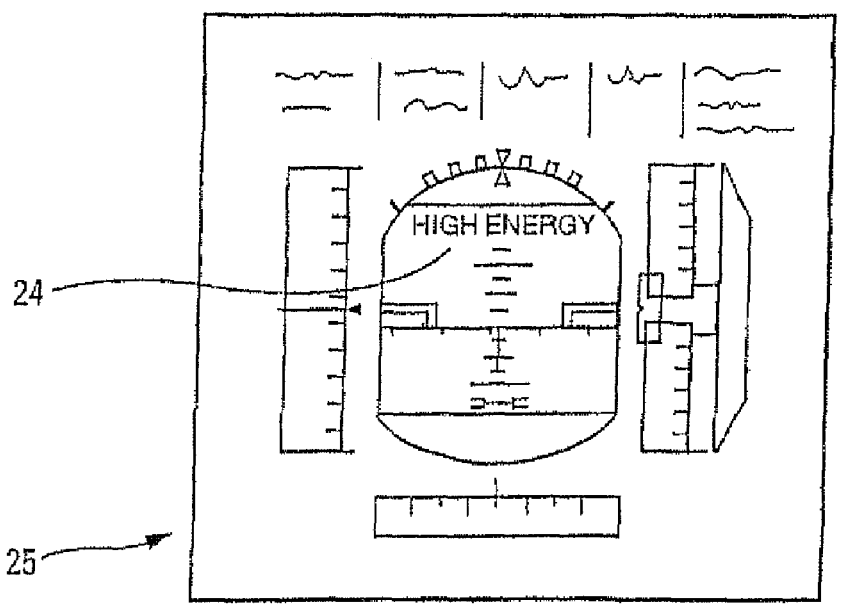
FIG. 3 shows an exemplary display of a warning signal generated by the implementation of the inventive method.

In FIG. 3, the screen 25 is represented by a PFD (Primary Flight Display) screen, on which is displayed the message 24 "High Energy" informing the pilot that the energy of his airplane is excessive for a correct landing. Obviously, in case of an energy deficit, the message 24 could be, for example, "Low Energy".

When correct, the total energy level of the airplane can also be displayed on said screen 24, for example in the form of "Correct Energy".

The invention claimed is:

1. A landing assistance method for an aircraft in approach phase located at a current height h and descending toward a runway following, with a current approach speed V, a current approach trajectory forming with said runway a current approach angle γ, said current approach speed V and said current approach angle γ ideally needing to be close, respectively, to a constant reference approach speed Vr and a constant reference approach angle γ associated with said runway, wherein:
   a range of approach speed values is predetermined, either side of said reference approach speed Vr, that will allow for a complete stoppage of said aircraft on said runway in the case where the current approach angle γ is at least approximately equal to said reference approach angle γr, said range of approach angles being delimited by
   a lower limit value Vinf and by an upper limit value Vsup;
   a range of approach angle values is predetermined, either side of said reference approach angle γr, that will allow for a complete stoppage of said aircraft on said runway in the case where the current approach speed V is at least approximately equal to the reference approach speed Vr, said range of approach angle values being delimited by a lower limit value γinf and by an upper limit value γsup;
   there are calculated:
   a lower total energy threshold Einf, corresponding to the situation for which the current approach speed V and the current approach angle γ are respectively equal to said lower limit value Vinf and said lower limit value γinf,
   an upper total energy threshold Esup, corresponding to the situation for which the current approach speed V and the current approach angle γ are respectively equal to said upper limit value Vsup and said upper limit value γsup, and
   the current total energy E of said aircraft; and
   said current total energy E is compared with said lower Einf and upper Esup total energy thresholds to obtain an indication as to the theoretical possibility for said aircraft to stop on said runway.

2. The method as claimed in claim 1, wherein, to carry out said comparison, an index I1 is calculated, by the expression:

$$I1 = (E - Einf)/(Esup - Einf).$$

3. The method as claimed in claim 1, wherein:
   a reference total energy Er is calculated that corresponds to the situation for which the approach speed and the approach angle are respectively equal to the reference approach speed Vr and the reference approach angle γr; and
   said current total energy E and said reference total energy Er are compared, the result of this comparison being itself compared to at least one of said lower Einf and upper Esup total energy thresholds.

4. The method as claimed in claim 3, wherein:
   if E is greater than Er, E−Er can be compared to Esup−Er; and
   if E is less than Er, Er−E can be compared to Er−Einf.

5. The method as claimed in claim 1, wherein said lower Vinf and upper Vsup approach speed limit values are, preferably, at least approximately equal to said reference approach speed Vr, respectively minus and plus a few kts.

6. The method as claimed in claim 1, wherein said lower γinf and upper γsup approach angle limit values are at least approximately equal to said reference approach angle γr, respectively minus and plus a few tenths of a degree.

7. The method as claimed in claim 1, wherein the result of said comparison is displayed near to the pilot of the aircraft.

8. The method as claimed in claim 1, wherein a prediction indication as to the complete stoppage of the aircraft on said runway is associated with said result of said comparison.

9. A device for implementing the method specified under claim 1, wherein it comprises:
   computation means:
      receiving at least the information concerning the current mass m, the current height h, the current approach speed V and the current approach angle γ of the aircraft, and the lower speed limit value Vinf, the upper speed limit value Vsup, the lower approach angle limit value γinf and the upper approach angle limit value γsup and, where appropriate, the reference approach speed Vr and the reference approach angle γr; and
      calculating at least one index, the value of which is representative of the fact that the level of said current total energy E of the aircraft is correct, excessive or deficient; and
   comparison means comparing said index to at least one threshold value corresponding to a transition between a correct total energy level and an excessive or deficient total energy level, said comparison means being able to actuate at least one warning or alarm device, at least in the case where said current total energy level E of the aircraft is excessive or deficient.

10. The device as claimed in claim 9, wherein at least one warning or alarm device comprises a standard piloting screen on which a warning or alarm message can be written concerning said current total energy level under the action of said comparison means.

* * * * *